US006797976B2

(12) United States Patent
Pechan et al.

(10) Patent No.: US 6,797,976 B2
(45) Date of Patent: Sep. 28, 2004

(54) METHOD AND APPARATUS FOR EXAMINING DEFECTS IN OR ON SHEET MATERIAL

(75) Inventors: Christian Pechan, Bad Endorf (DE); Bernd Wunderer, München (DE)

(73) Assignee: Giesecke & Devrient, Munich (DE)

(*) Notice: Subject to any disclaimer, the term of this patent is extended or adjusted under 35 U.S.C. 154(b) by 80 days.

(21) Appl. No.: 10/216,296

(22) Filed: Aug. 12, 2002

(65) Prior Publication Data

US 2003/0042443 A1 Mar. 6, 2003

(30) Foreign Application Priority Data

Aug. 13, 2001 (DE) ........................................ 101 39 717

(51) Int. Cl.[7] .............................................. G01N 21/88

(52) U.S. Cl. ............................ 250/559.45; 250/559.46; 356/429

(58) Field of Search .......... 250/559.42, 559.45–559.46; 356/429–430, 237.1

(56) References Cited

U.S. PATENT DOCUMENTS 4,099,884 A * 7/1978 Nash .......................... 356/430
4,519,249 A 5/1985 Hunt
4,723,072 A 2/1988 Naruse
5,047,652 A 9/1991 Lisnyansky et al.
5,255,907 A 10/1993 Orlandini
5,537,615 A 7/1996 Kelly
5,590,790 A 1/1997 Saunders
5,657,847 A 8/1997 Tod et al.
5,767,975 A * 6/1998 .ANG.hlen .................. 356/429
5,955,741 A 9/1999 Kayani
6,020,969 A * 2/2000 Struckhoff et al. .......... 356/430
6,198,537 B1 * 3/2001 Bokelman et al. .......... 356/429

FOREIGN PATENT DOCUMENTS

| | | |
|---|---|---|
| EP | 0 130 797 | 1/1985 |
| EP | 0 668 499 | 8/1995 |
| GB | 2 093 179 A | 8/1982 |
| WO | 92/00517 | 1/1992 |

* cited by examiner

*Primary Examiner*—David Porta
*Assistant Examiner*—Patrick J. Lee
(74) *Attorney, Agent, or Firm*—Bacon & Thomas, PLLC

(57) ABSTRACT

For examining defects in sheet material, in particular bank notes, the sheet material is convexly curved and tested in the area of the convex curvature. A detector is disposed tangentially to an apex line of the convex curvature for detecting elevations on the bank note surface due to bank note defects against a light background. A suitable optic is used to image this silhouette onto the detector. The detector is formed as a pixel array, and the number and height of shaded pixels are assessed as measures of defect density and size and nature of defects.

37 Claims, 2 Drawing Sheets

METHOD AND APPARATUS FOR EXAMINING DEFECTS IN OR ON SHEET MATERIAL

BACKGROUND OF THE INVENTION

This invention relates to a method and apparatus for examining defects in or on sheet material, in particular bank notes, in particular for determining creases, tears, holes or dog-ears. The invention relates in addition to a bank note processing machine having such an apparatus.

The main area of use for the invention is to determine defects in bank notes. However, the invention is suitable for examining any sheet material, in particular for examining papers of value, whose quality can sink below a given standard through signs of wear.

Bank notes in circulation are generally tested for quality and authenticity after returning to a commercial and/or national bank. This test is normally done automatically in specially developed bank note processing machines. In case of a negative test result, the particular bank note is withdrawn from circulation. Quality is assessed with reference to so-called fitness criteria, which are determined for example with reference to soiling, tears, creases, holes, dog-ears and/or stiffness of the tested note in comparison to a new note.

U.S. Pat. No. 5,955,741 discloses a plurality of methods for assessing the fitness of bank notes with reference to their stiffness. Bank note paper contains long fibers that break through frequent use, so that notes lose their initial stiffness in the course of time. This structural change of the bank note paper is detected in order to indirectly infer the stiffness or derive a corresponding fitness criterion for the note. According to one of the methods proposed therein, the optical transmission or reflection properties of the note are detected. The note is thus irradiated with IR light (transmission measurement) or UV light (reflection measurement). The more IR light passes through the note or the more reflected UV light is scattered by the note surface, the poorer the quality of the note is to be rated.

The method proposed in U.S. Pat. No. 5,955,741 permits only a rough test of bank note properties, however. Large-area detection of reflected and transmitted radiation per-permits only statistical statements about defects in the paper. The contribution and size of individual defects is not determined.

SUMMARY OF THE INVENTION

The problem of the present invention is to propose an improved method and apparatus for examining defects in or on sheet material.

According to the invention, the sheet material is convexly curved and the defects located in the area of the convex curvature detected. Convex curvature of the bank note makes any defects more evident. Broken fiber ends protrude out of the paper, tears and holes are extended. Defects can thus be detected more easily.

Defects are preferably detected along an apex line or at individual points of an apex line. However, the inventive solution also quite generally provides convex curvatures of sheet material that have no apex line but a summit. Defects are accordingly detected in the area of said summit. Defects are preferably detected by means of an optical sensor. Optical sensors are inexpensive and available in numerous variants, so that they can be integrated into existing bank note processing machines at no great cost.

To permit the size and contribution of single defects to be individually detected, a preferred embodiment of the invention provides that an optical detector is disposed in an apex line plane of the convexly curved sheet material and directed toward the apex line so that the apex line of the convexly curved sheet material forms for the detector a kind of horizon above which defects of the bank note rise in silhouette. An apex line plane within the meaning of the invention is thus a plane tangential to the convex curvature, and the apex line within the meaning of the invention is defined by the tangent line between convex curvature and apex line plane. The convexly curved area of the sheet material will also be referred to as the apex in the following.

To permit optimal detection of the silhouette arising from the defects, it is advantageous if the apex of the curved sheet material is disposed against a light background. A uniformly light, homogeneous background can be obtained by means of a fluorescent lamp, a brightly illuminated surface, an LED row, or an LED array with a scattering medium disposed therebefore.

Precision of the test results can be improved if an optic is provided between the apex and the detector for imaging at least one point on the apex or apex line onto the detector. The imaging optic used may be for example a spherical, aspherical or cylindrical convergent lens or a self-focusing lens array (so-called Selfoc lenses).

A preferred detector includes a pixel array aligned parallel to the apex line. This permits adjacent areas of the apex to be separately detected and evaluated. The pixel array is preferably formed as a two-dimensional pixel array with pixels disposed in a uniform grid or as a one-dimensional pixel array with elongate pixels disposed perpendicular to the apex line. The individual pixels are formed as photosensitive elements, preferably as photodiodes or charge-coupled detector elements, so-called CCDs.

The silhouette caused by the defects is imaged on the pixels of the detector directed toward the apex line as a shadow, in particular against a light background when using an imaging optic. The more defects are present in the sheet material, the more elevations the silhouette has and accordingly more adjacent pixels of the detector are located in the shadow. The larger the defects are, the higher the silhouette is in the corresponding apex area and the more pixels disposed one above the other are located in the shadow. In the case of a one-dimensional detector array with elongate pixels disposed perpendicular to the apex line, the voltage per pixel is dependent on the height of the shadow falling on the pixel. This permits a measure of local density of defects to be derived from the number of unilluminated pixels, and a measure of size and/or an indication of the nature of the defects from the height of unilluminated pixels. For this purpose an accordingly formed evaluation device connected with the detector is provided.

A specific preferred embodiment of an apparatus for carrying out the test method provides that the convex curvature of sheet material is effected on a convexly curved component. This can preferably be a stationary linear element or a transport cylinder. Such components are readily present in bank note processing machines or can be added without any great effort.

Additionally, belts can be provided to ensure that sheet material rests reliably on the curvature of the convexly curved component. This reduces the danger of the apex line of convexly curved sheet material moving out of the focusing line.

Examination of sheet material can be effected during sheet transport so that the detector detects a silhouette changing in time which is evaluated by the evaluation device in real time. If defects fail to meet a given fitness criterion according to number and/or height, the corresponding bank note is withdrawn from circulation.

Apart from defects, the above-described system can also be used to detect and evaluate light reflexes due to strongly reflective areas, such as security threads, adhesive strips, kinegrams, etc., so that authenticity features of sheet material can be tested in addition or as an alternative to quality.

BRIEF DESCRIPTION OF THE DRAWINGS

In the following, the invention will be explained by way of example with reference to the accompanying drawings, in which.

DESCRIPTION OF THE INVENTION

Figure 1:
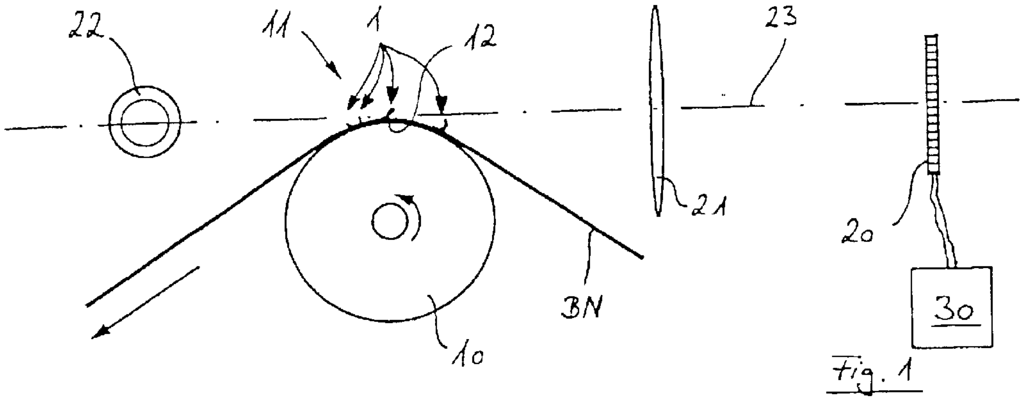
FIG. 1 shows a schematic side view of a preferred embodiment of the invention in a side view.
Figure 2:
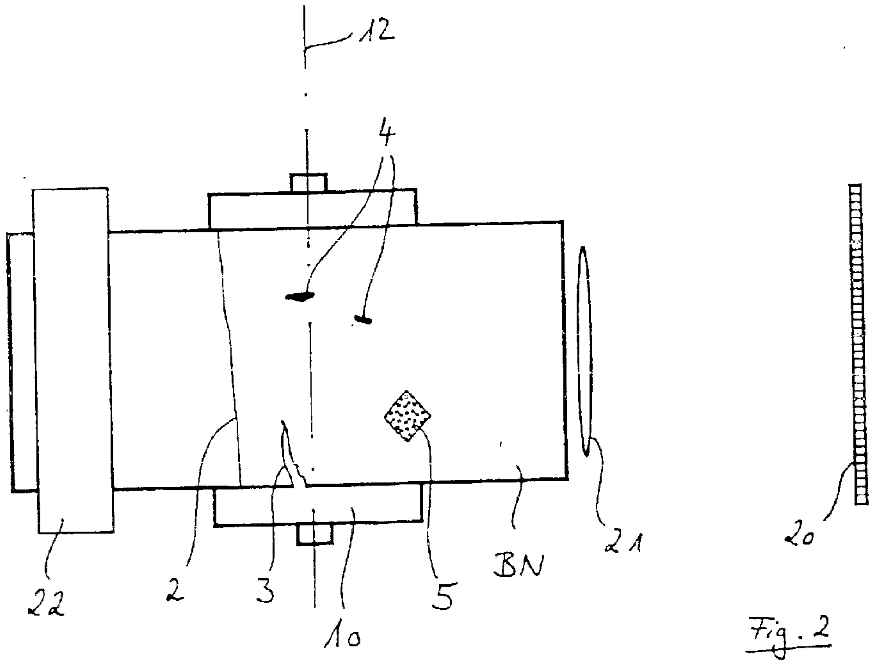
FIG. 2 shows the apparatus from FIG. 1 schematically in a plan view.

FIG. 1 shows schematically a side view of an apparatus for examining defects on a bank note according to a first preferred embodiment. Note BN is transported over transport cylinder 10 rotating in the direction of the arrow. The transport direction of note BN is likewise indicated by an arrow. Convex curvature of note BN on transport cylinder 10 causes individual defects 1 to emerge from the surface of the note in curvature area or apex 11. Defects 1 are shown disproportionately large for clarity's sake. They are normally small defects, for example ends of broken fibers standing out of the bank note paper or the like. However, tears, holes and dog-ears also appear as elevations above the surface of note BN in the curvature area. FIG. 2 shows the apparatus from FIG. 1 in a plan view. One can see that defects 1 are fold 2, tear 3 and other defects 4 such as elevations, holes, protruding fibers, etc. In addition, reflective element 5, for example a kinegram, is located on the surface of note BN.

Figure 5:
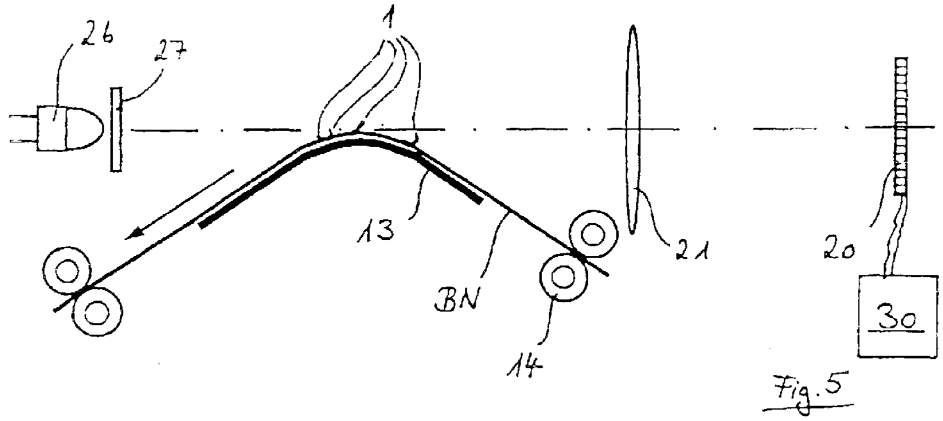
FIG. 5 shows an apparatus according to a further preferred embodiment of the invention.

A sensor is used to examine the note for defects 1 to 4 and reflective element 5. The sensor includes detector 20 directed toward apex 11 of transport cylinder 10 or note BN and located in apex line plane 23. Detector 20 looks beyond apex 11, so to speak, so that apex line 12 forms a kind of horizon for detector 20. Defects 1 to 4 rise above this horizon in silhouette. To image the silhouette optically onto detector 20, optic 21, formed as a conventional spherical convergent lens here, is disposed between apex line 12 and detector 20. Depending on the case of application, optic 21 can also consist of aspherical or cylindrical lenses. In addition to detector 20 and imaging optic 21, the sensor for examining defects 1 to 4 and reflective element 5 includes a homogeneous, light background in prolongation of the optical axis leading from detector 20 to apex 11. The homogeneous light background is formed here by illuminating means 92, in particular a fluorescent tube. However, this may also be an illuminated light surface or, as seen in FIG. 5, LED row 26 or an LED array preceded by diffusing disk 27. This makes defects 1 to 4 appear to detector 20 as dark elevations above apex line 12 of apex 11 against the light background.

Figure 3:
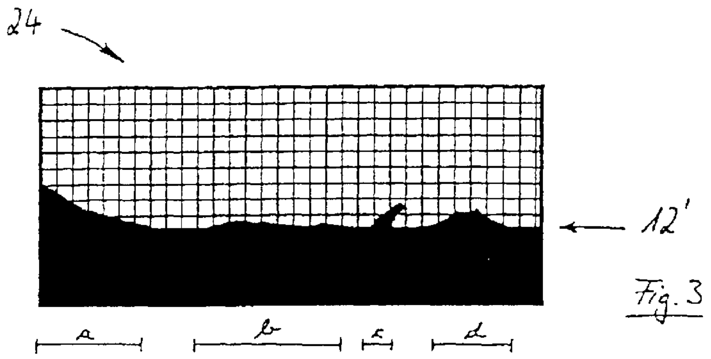
FIG. 3 shows a two-dimensional pixel array used according to the invention.
Figure 4:
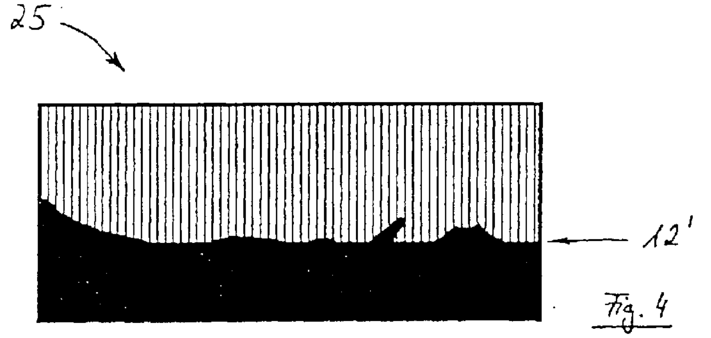
FIG. 4 shows a one-dimensional pixel array used according to the invention.

Detector 20 includes a pixel array. It may be two-dimensional pixel array 24 with uniformly disposed, square pixels, as seen in FIG. 3. However, it may also be one-dimensional pixel array 25 with elongate pixels oriented perpendicular to apex line 12, as seen in FIG. 4. Differently structured pixel arrays can of course also be used.

FIGS. 3 and 4 show the shadow of apex 11 of convexly curved note BN cast on detector 20. Height 12' marks the horizon or apex line 12. Below height 12' all pixels are located in the shadow of apex 11. Insofar as pixels are located in the shade above height 12', such shadows are due to elevations or defects 1 to 4 rising above the note surface. In FIG. 3, pixel array areas are designated a to d where the shadow goes beyond apex line height 12'. The silhouette in shadow area a is due to lateral tear 3 of note BN. The silhouette in shadow area b is due to fold 2, which is already located behind apex line 12, as indicated by FIG. 2. Use of optic 21 causes the silhouette in area b to be blurred, so that it can be filtered out with a suitable evaluation device. On the other hand, subsequent filtering out can be omitted if an optic with long focal length is used, so that only shadows in the direct apex line area are imaged onto the detector due to the low depth of focus. The silhouette in shadow area c may be due for example to fibers protruding from the note, and the silhouette in shadow area d to an elongate hole or the like in the note.

The silhouette of the shadow changes constantly when note BN is moved in the transport direction. Evaluation device 30 is used to evaluate the changing shadow patterns in real time. In the case of two-dimensional pixel array 24 shown in FIG. 3, each individual pixel delivers a voltage that is between a lowest value in the case of complete illumination and a highest value in the case of complete shading. Limiting values can also be used, so that a mainly illuminated pixel does not deliver any voltage and a mainly shaded pixel delivers a given voltage that is equal for all mainly shaded pixels. The number of shaded pixels above apex line height 12' serves as a measure of defect density in tested note BN. Furthermore, the silhouette height is evaluated with reference to the number of shaded pixels located one above the other. Silhouette height is assessed as a measure of the size of defects or as an indication of the nature of defects. In the case of shadow area a, the exceptional silhouette height at the edge of the note indicates for example that the note has a tear on the side.

Instead of two-dimensional pixel array 24, one-dimensional pixel array 25 can also be used, as shown in FIG. 4. The voltage delivered by the individual pixels depends on the height of their shading. The pixel on the extreme left thus delivers the highest voltage in the shown example. In this case, defect density can also be inferred from the number of pixels delivering an elevated voltage, and defect size and/or nature of defects inferred from the voltage level of the individual pixels. The continuous measurement results in a temporal and thus three-dimensional image of the note surface. This temporal aspect is taken into account upon evaluation and classification of the particular shadow patterns.

Strongly reflective areas of the note, which may be due to kinegram 5 for example, can also be detected by means of the above-described apparatus since detector 20 receives an unusual amount of radiation for said areas so that the voltage delivered by the particular pixels drops below the value of the background brightness. An additional detector can optionally be provided, which can be constituted like above-described detector 20 and in particular designed as a pixel array, for detecting reflected light.

FIG. 5 shows a further special embodiment of the inventive apparatus for examining defects in or on sheet material. The view of FIG. 5 corresponds to the schematic view of the embodiment according to FIG. 1 with a few differences. Instead of fluorescent tube 22, LED row 26 is provided in this case, whereby diffusing disk 27 disposed therebefore converts the LED radiation into radiation homogeneous across the surface. An especially homogeneous background can be obtained by using an LED array wherein the individual LEDs are distributed across a surface. Here, too, further homogenization of the illumination can be obtained by a diffusing disk additionally disposed before the LED array. Instead of transport cylinder 10, convexly curved guiding plate 13 is provided over which note BN is guided. Roller system 14 ensures the necessary feed in the transport direction. Additionally a belt system can be provided in this embodiment, as in the embodiment shown in FIG. 1, for urging note BN onto transport cylinder 10 or guiding plate 13 to reliably guide note BN The belts should of course be as narrow as possible since they cover the surface of note BN under test so that the note cannot be examined in the relevant area.

What is claimed is:

1. A method for examining defects in or on sheet material, comprising the steps of:

convexly curving the sheet material and examining defects of the sheet material in the area of the convex curvature; and directing at least one optical detector toward an apex or an apex line of the convex curvature such that the apex line of the convexly curved sheet material forms for the detector a horizon above which defects of the sheet material rise in silhouette.

2. The method according to claim 1, wherein the optical detector is positioned in the plane of the apex or apex line.

3. The method according to claim 2, wherein an optic is provided between the apex or apex line and the detector for imaging at least one point in the area of the apex or apex line onto the detector.

4. The method according to claim 3, wherein a self-focusing lens or self-focusing lens array is used as an optic.

5. The method according to claim 2, wherein the apex line is disposed against a light background as observed from the detector.

6. The method according to claim 5, wherein a fluorescent lamp serves as a light background.

7. The method according to claim 5, wherein an illuminated surface serves as a light background.

8. The method according to claim 5, wherein an LED row or an LED array serves as a light background.

9. The method according to claim 1, wherein the detector includes a pixel array.

10. The method according to claim 9, wherein the form of the pixel array is selected from the group consisting of a one-dimensional pixel array with elongate pixels, and a two-dimensional pixel array with square pixels.

11. The method according to claim 9, wherein the number of unilluminated pixels is assessed as a measure of local density of defects.

12. The method according to claim 9, wherein the height of unilluminated pixels is assessed as a measure of size and/or an indication of nature of defects.

13. The method according to claim 1, wherein convex curvature is effected on a convexly curved component.

14. The method according to claim 13, wherein convex curvature is effected on a transport cylinder.

15. The method according to claim 13, wherein the sheet material is urged against the convexly curved component by means of one or more belts.

16. The method according to claim 1, wherein convex curvature and examination of defects are effected with the sheet material moving.

17. The method according to claim 1, wherein light reflexes due to strongly reflective areas of the sheet material are detected and evaluated.

18. An apparatus for examining defects in or on sheet material, comprising a device arranged to convexly curve the sheet material and at least one detector arranged to detect defects in the area of the convex curvature wherein the detector is directed toward an apex or an apex line of the convex curvature such that the apex line of the convexly curved sheet material forms for the detector a horizon above which defects of the sheet material rise in silhouette.

19. The apparatus according to claim 18, wherein the detector is an optical detector.

20. The apparatus according to claim 19, wherein the optical detector is positioned in the plane of the apex or apex line.

21. The apparatus according to claim 20, wherein an optic is provided between the apex or apex line and the detector, and is arranged to image at least one point in the area of the apex or apex line onto the detector.

22. The apparatus according to claim 21, wherein the optic is a self-focusing lens or self-focusing lens array.

23. The apparatus according to claim 20, wherein the apex or apex line is located against a light background as observed from the detector.

24. The apparatus according to claim 23, including a fluorescent lamp that serves as a light background.

25. The apparatus according to claim 23, including an illuminated surface that serves as a light background.

26. The apparatus according to claim 23, wherein an LED row or an LED array is disposed therebefore, and serves as a light background.

27. The apparatus according to claim 19, wherein the detector includes a pixel array.

28. The apparatus according to claim 27, wherein the form of the pixel array is selected from the group consisting of a one-dimensional pixel array with elongate pixels, and a two-dimensional pixel array with square pixels.

29. The apparatus according to claim 27, comprising an evaluation device in which the number of unilluminated pixels comprises a measure of local density of defects.

30. The apparatus according to claim 27, comprising an evaluation device in which the height of unilluminated pixels comprises a measure of size and/or an indication of nature of defects.

31. The apparatus according to claim 18, wherein the device arranged to convexly curve the sheet material is a curved component.

32. The apparatus according to claim 31, wherein the device arranged to convexly curve the sheet material is a transport cylinder.

33. The apparatus according to claim 31, wherein belts are provided which are capable of urging the sheet material against the convexly curved component.

34. The apparatus according to claim 18, which is formed for examining the sheet material with the sheet material moving.

35. The apparatus according to claim 18, wherein the detector and/or an additional detector is formed or provided so as to detect light reflexes due to strongly reflective areas of the sheet material.

36. The apparatus according to claim 35, wherein the additional detector is formed as a pixel array.

37. A bank note processing apparatus comprising an apparatus according to claim 18.

* * * * *